US008751282B2

(12) United States Patent
Schaad

(10) Patent No.: US 8,751,282 B2
(45) Date of Patent: Jun. 10, 2014

(54) CONTROLS IN COLLABORATIVE WORKFLOW ENVIRONMENT

(75) Inventor: Andreas Schaad, Bad Pymont (DE)

(73) Assignee: SAP AG, Walldorf (DE)

( * ) Notice: Subject to any disclaimer, the term of this patent is extended or adjusted under 35 U.S.C. 154(b) by 2731 days.

(21) Appl. No.: 11/412,372

(22) Filed: Apr. 27, 2006

(65) Prior Publication Data

US 2007/0255610 A1    Nov. 1, 2007

(51) Int. Cl.
*G06Q 10/00* (2012.01)

(52) U.S. Cl.
USPC .......................................................... 705/7.27

(58) Field of Classification Search
USPC .......................................................... 705/7.27
See application file for complete search history.

(56) References Cited

U.S. PATENT DOCUMENTS

2002/0052769 A1* 5/2002 Navani et al. .................. 705/7

OTHER PUBLICATIONS

"Collaborative Workflow Security", http://www.cs.york.ac.uk/dame/DAMEOpenDay19032994-workflow.ppt, The DAME project summarised in 9 does only focus on issues of access control in collaborative workflows using XACML. As they do not distinguish between private and public workflows, this is not of relevance compared to our solution., (Observed Feb. 16, 2006),11 pgs.
"Service Interaction Patterns", http://sky.fit.qut.edu.au/~dumas/ServiceInteractionPatterns/, The service patterns mentioned in 8 do not bear any resemblance to our notion of patterns as they focus on reoccuring control flow interactions such as "fork" or "join".,(Observed Feb. 16, 2006),2 pgs.
"Workflow and BP Research", http://www.workflow-research.de/, The internet pages of 6. and 7. summarise the current state of the art in (collaborative) workflow systems. There is no indication that they identify the necessity and problem of specifying separation properties in a collaborative workflow environment.,(Observed Feb. 16, 2006).
"Workflow Patterns", http://is.tm.tue.nl/research/patterns/, The internet pages of 6. and 7. summarise the current state of the art in (collaborative) workflow systems. There is no indication that they identify the necessity and problem of specifying separation properties in a collaborative workflow environment.,(Observed Feb. 16, 2006).
Ahn, G , et al., "The RSL99 language for role-based separation of duty constraints", *Proceedings of the fourth ACM workshop on Role-based access control*, Paper 5. proposes a language for specifying separation properties. This is a simple predicate logic dialect. The key difference to our IDF is that workflows are not used as a context medium.,(1999),43-54.
Botha, R. A., et al., "Separation of duties for access control enforcement in workflow environments", *IBM Systems Journal*, 40(3), Paper 10 describes some possible separation properties in workflow systems. However, they do not focus on collaborative systems that distinguish between private and public workflows as we do. The results of 10 do not apply in our problem context.,(Mar. 2001),666-682.

(Continued)

*Primary Examiner* — Jonathan G Sterrett
(74) *Attorney, Agent, or Firm* — Schwegman Lundberg & Woessner, P.A.

(57) ABSTRACT

A method to implement controls with respect to a collaborative workflow, the method including mapping a private task of a private workflow of a first entity to a public task of a public collaborative workflow, and defining a public control relating to the public task, the public task and the public control to be published to a second entity with which the first entity collaborates utilizing the public collaborative workflow.

23 Claims, 8 Drawing Sheets

(56) References Cited

OTHER PUBLICATIONS

Gligor, V S., et al., "On the formal definition of separation-of-duty policies and their composition", *1998 IEEE Symposium on Security and Privacy, Proceedings*, (1998),172-183.

Kang, M , et al., "Access control mechanisms for inter-organizational workflow", *Proceedings of the sixth ACM symposium on Access control models and technologies*, Paper 11 claims how to enforce separation of duty constraints in a collab. workflow. However, no further description of how they do it,(2001),66-74.

Kuhn, R , "Mutual exclusion of roles as a means of implementing separation of duty in role-based access control systems", *Proceedings of the second ACM workshop on Role-based access control*, (1997),23-30.

Sandhu, R S., "Role Based Access Control Models", *IEEE Computer*, 29(2), Paper 3 [this paper] describes the RBAC96 standard for role-based access control. Here the notion of exclusive role is used as the basis for specifying separation properties. Again, there is notion of workflows in the 3,(1996),38-47.

Sandhu, R. S., "Role-based Access Control Models", *IEEE Computer*, 29(2), (Feb. 1996),35-44 and abstract.

Schultz, K , et al., "Facilitating cross-organisational workflows with a workflow view approach", *Data Knowl. Eng.* , 51(1) describes a model for collaborative workflowsÄ??notions of private and public workflowsÄ??model does not identify necessity and problem of specifying separation properties in a collaborative workflow environment,(2004),109-147.

* cited by examiner

CONTROLS IN COLLABORATIVE WORKFLOW ENVIRONMENT

FIELD

This application relates to a method and system to implement controls in a collaborative workflow environment.

BACKGROUND

The controlled and demonstrable execution of tasks is an increasing requirement in the business world, partly triggered through new legal guidelines (e.g., the Sarbanes-Oxley Act, Basel II, and the Health Insurance Portability and Accountability Act (HIPAA)). While many current Enterprise Resource Planning (ERP) systems (e.g., SAP, IBM MQ Workflow and BEA Systems) make it possible to monitor activities with respect to a workflow, a number of restrictions exist with respect to collaborative and distributed workflow systems that span organizational and technical boundaries.

For example, consider that control over the execution of tasks in a workflow may be enforced through the definition of workflow models, instances of which are specified to be executed in a designed fashion. However, it is not always possible to define each and every execution path in a workflow model, and a workflow model may as such be augmented by a set of declarative rules.

An example workflow may be a loan approval process, which is an example of a very repetitive process in the banking domain. However, as a large number of instances of this process may be executed at the same time (e.g., several thousand customers may apply for a loan each week), it may be desirable to capture specific conditions in rules. For example, a rule may specify that if a loan is greater than a predetermined amount, a supervisor is required to counter check.

Such rules may be viewed as "separation of duty" rules, in that they may operate to prevent error and fraud through a general, or context-dependent, limitation of a particular entity's tasks and authorities.

It will be appreciated that certain collaborative and distributed workflow systems may span organizational and technical boundaries. The definition of rules (e.g., "separation of duty" rules, or other controls) presents technical challenges in such collaborative and distributed workflow systems. Merely for example, certain aspects of a collaborative workflow may include private tasks, and one party to a collaborative workflow may be reluctant to make details regarding private workflows publicly available. Also for example, consider that the tasks defined by collaborating parties may be defined in non-compatible manners.

SUMMARY

According to one example aspect, there is provided a method to implement controls with respect to a collaborative workflow environment.

Features will be apparent from the accompanying drawings and the detailed description that follows.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

In order to achieve a defined objective, multiple organizations often need to collaborate, such collaboration requiring the coordination and connection of processes and Information Technology (IT) systems. This need for collaboration has been reflected in a variety of interoperability-enabling disciplines (e.g., workflow and trust management) that increasingly leverage existing and emerging web service technologies.

There is below described an example embodiment of a method and system to enable the specification of application-level controls in a collaborative workflow environment, wherein workflow management systems enable a mapping of private workflows (and included tasks) of an organization to a public workflow, the public workflow acting as a "linking element" between organizations. Organizations may, in certain circumstances, wish to enable a collaborating partner to exercise some control over the organization's private processes. Such controls may be at any one of a number of levels. For example, such controls may be implemented at an application level (e.g., as a separation of duties, specified utilizing separation of duty rules). However, while a particular organization may wish to enable a collaborating partner to exercise some control over its private processes, the organization may at the same time require that the internal processes (e.g., tasks) of the organization should remain hidden.

An example embodiment of a method and system for the specification of controls (e.g., separation of duty constraints or rules) in a collaborative work system are described. In the example embodiment, a trusted workflow control mediator supports the mapping of private workflows and separation policies to business process patterns maintained by the trusted workflow control mediator.

Figure 1:
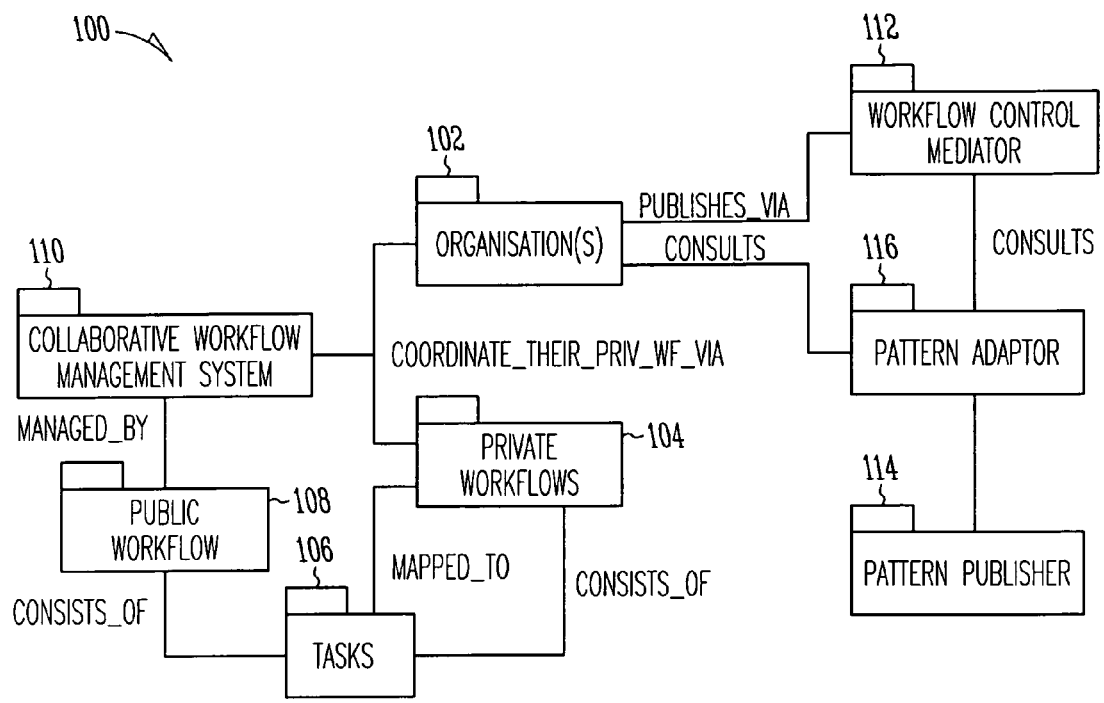
FIG. 1 is an entity-relationship diagram illustrating the basic structure of a system, according to an example embodiment, to implement controls (e.g. separation of duty rules) in a collaborative workflow environment.

FIG. 1 is an entity-relationship diagram illustrating a system 100, according to an example embodiment, to enable controls in a collaborative workflow environment. Specifically, FIG. 1 indicates that organizations 102 have private workflows 104, which may reflect core business activities and procedures for achieving organizational goals. Each private workflow 104 consists of a specific ordering of tasks 106. When organizations 102 interact, according to an example embodiment, they can map private workflows 104 to tasks 106 of one or more public workflows 108. FIG. 1 also indicates that each public workflow may also consist of a specific ordering of tasks 106.

A collaborative workflow management system 110 manages the public workflows 108, as will be described in further detail below, and allows organizations 102 to thus coordinate respective private workflows 104 without revealing selected details of those private workflows 104. Accordingly, the collaborative workflow management system 110, in the example embodiment, enables the coordination of private workflows 104 between collaborating organizations 102, while enabling each of the organizations 102 to maintain varying degrees of privacy with respect to the details of their private workflows 104.

When an organization 102 wishes to publish a control (e.g., a separation property rule or constraint) relating to a private workflow 104 of that organization 102, the organization 102 engages with a trusted third party, in the example form of a trusted external workflow control mediator 112. Specifically, the organization 102 and the workflow control mediator 112 will consult a pattern that most closely resembles a private workflow 104 of the relevant organization 102. Any number of patterns may be defined by independent pattern publishers 114 (e.g., RosettaNet, the ebXML Initiative etc.), and a pattern adapter 116 may be used to facilitate a choice, by the workflow control mediator 112 and a particular organization 102, of an appropriate pattern publisher 114 from any number of pattern publishers 114.

An organization, having identified a pattern that satisfactorily resembles a particular private workflow 104, can then specify and publish controls (e.g. separation of duty rules or constraints) pertaining to the relevant private workflow 104. These controls are mapped to a corresponding appropriate control within the selected published pattern. Further details in this respect are provided below.

Figure 2:
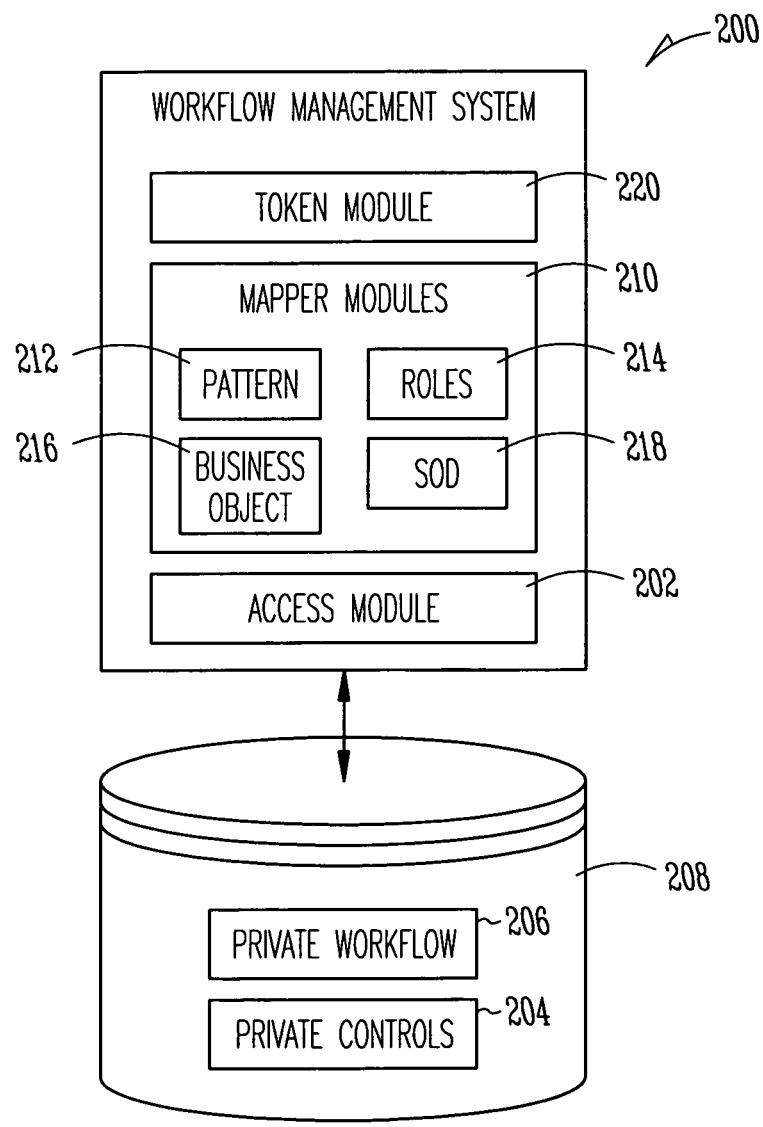
FIG. 2 is a block diagram illustrating the architecture of a workflow management system, according to an example embodiment, that may be operated by an organization in order to perform certain functions with respect to private workflows, a collaborative workflow management system, and a workflow control mediator.

FIG. 2 is a block diagram illustrating the architecture of a workflow management system 200, according to an example embodiment, that may be operated by an organization 102 in order to perform certain functions with respect to private workflows 104, a collaborative workflow management system 110, and a workflow control mediator 112. While certain operations are described as being performed in an automated manner by the workflow management system 200, it will be appreciated that any number of these operations may be manually performed. The workflow management system 200 may be furthermore deployed on computer systems of a particular organization, and may operatively be connected to a collaborative workflow management system 110 and a workflow control mediator 112 via a network (e.g. the Internet).

The workflow management system 200 includes an access module 202 that operationally access private workflows 206 (including associated information such as role, business object and status information) and private controls 204 (e.g., specification of duty rules) pertaining to the private workflows 206 of the relevant organization 102. As shown, the private controls 204 and the private workflows 206 may be stored in a database 208 to which the workflow management system 200 has access, and the access module 202 may operate to access the workflows 206 and the controls 204 within the database 208.

The workflow management system 200 further comprises a number of mapper modules 210, namely a pattern mapper module 212, a roles mapper module 214, a business object mapper module 216 and a separation of duties mapper module 218. The operations of these various modules will be described below with reference to FIG. 3.

The workflow management system 200 further includes a token module 220 that may operate to generate and publish integrity tokens, as will also be described in further detail below with reference to FIG. 3.

Figure 3:
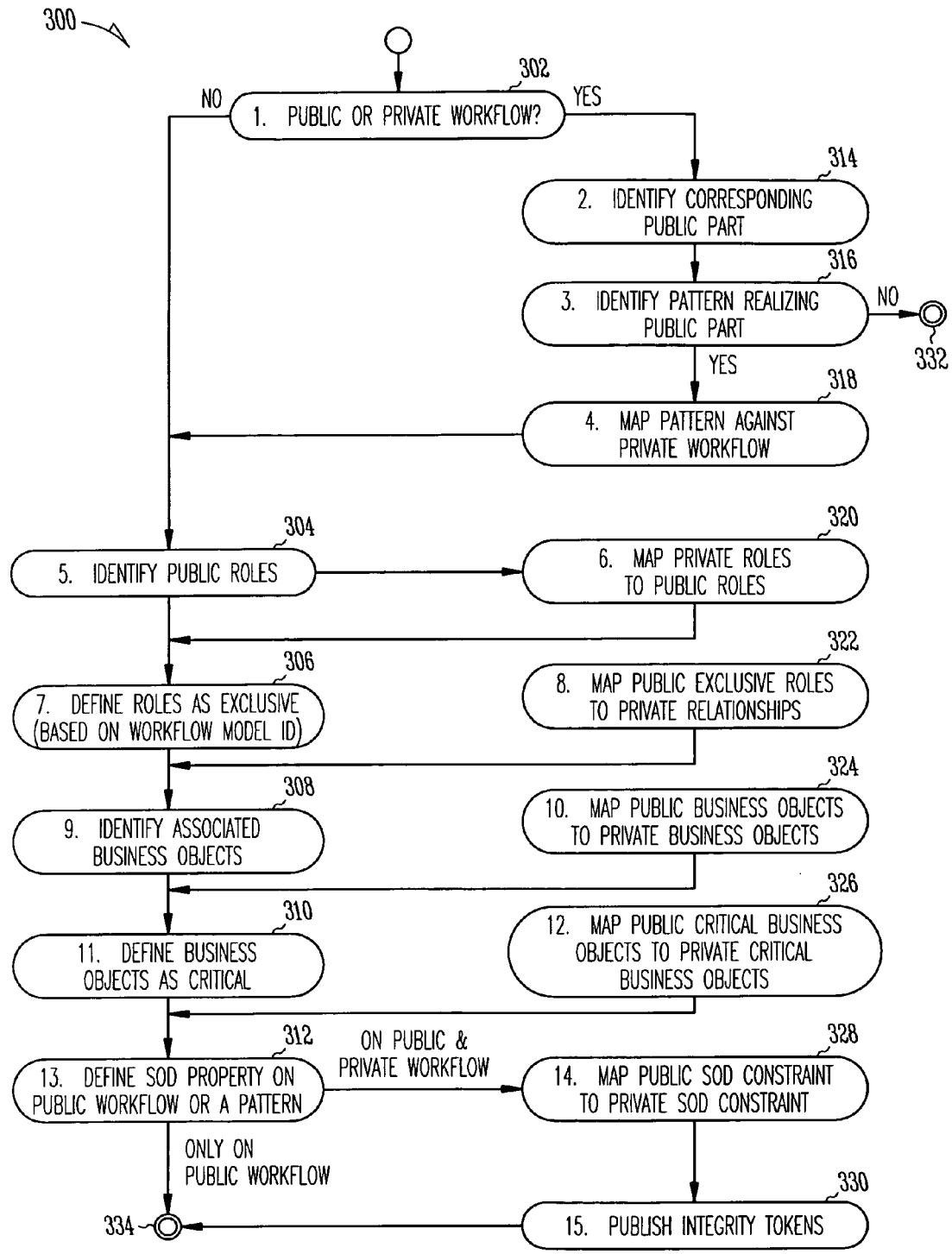
FIG. 3 is a flow chart illustrating a method, according to an example embodiment, to implement controls within a collaborative workflow environment.

FIG. 3 is a flow chart illustrating a method 300, according to a general example embodiment, to facilitate controls with respect to a collaborative workflow. The operations comprising the example method 300 may be performed in an automated manner by a workflow management system 200, or may at least partially be performed in a manual manner.

The method 300 begins with at least a first entity (e.g., an organization) wishing to define controls over a collaborative workflow between the organization and a further, collaborating organization. In an example embodiment, these controls may be defined as separation of duty properties. In one embodiment, a first organization may define a separation of duty properties with respect to itself, and publish certain controls in a general manner, absent the context of a specific collaboration project or partner. In another embodiment, two or more organizations may work together to define controls with respect to a collaborative workflow.

The method 300 commences, as noted above, with a need to define controls with respect to a collaborative workflow process. One or more parties interested in a collaborative workflow process accordingly need to identify (operation 302) whether the controls (e.g., separation of duty properties, rules or constraints) are to be applied with respect to public components of the collaborative workflow process, or with respect to respective private components of the private workflow process of the relevant organization.

In the event that the controls need to be specified with respect to a public component, then public roles required for the public component of the collaborative workflow process are identified (operation 304). These public roles may then be related to each other based on an exclusive relationship (operation 306). For example, roles may be related to each other based on an exclusive relationship dependent on whether this is required for the specification of a separation of duty property or other control. Furthermore, an exclusive relationship between roles within the collaborative workflow may include identifiers (e.g., a workflow model identifier or a partner identifier) as roles may be exclusive in one context, but not in another. For example, the two roles of manager and cashier may be exclusive with respect to a loan approval process but not within a standard withdrawal process. In various embodiments, roles may be related to each other based on other relationships (e.g., contradicting, mutually exclusive etc.).

Business objects (e.g., products, customers etc.) associated with the public workflow are then identified (operation 308), and selected business objects may then be defined as critical (operation 310) as may be required for certain dynamic separation of duty properties. Merely for example, a critical business object may require dynamic separation of duty properties for its protection. The criticality of a business object may, for example, be determined by a discrete value (e.g. loan contracts over 100 k EUR).

A control (e.g., a separation of duty property) may then be defined (operation 312) and deployed within the collaborative workflow management system 110 before the method 300 terminates (operation 334)

Returning to operation 302, if controls (e.g., separation of duty properties, constraints or rules) are to be defined on a private component of at least one entity's private workflow, a different path is followed by the method 300. Specifically, if at least one of the parties to a collaborative workflow process, at operation 302, indicates a need or desire to define controls (e.g. separation of duty properties) with respect to a private part (e.g. component) of the collaborative workflow process, the method 300 progresses to operation 314. Specifically, an entity participating in a collaborative workflow process may identify tasks, within a public (or collaborative) workflow, corresponding to private tasks of a private workflow for which the controls are to be defined or specified.

Following the identification of tasks of the public workflow, at least one entity (and possibly two or more entities) identify an available and general pattern that suitably represents the identified public tasks (of the public workflow) corresponding to the private tasks of the private workflow that are to be controlled. To this end, the entities (e.g., organizations 102) may consult with a pattern adapter 116, which has access to patterns published by any number of pattern publishers 114. The identification of patterns corresponding to the relevant public tasks may, in one embodiment, be performed by a workflow management system 200 of the relevant entities utilizing respective pattern mapper modules 212 to identify appropriate patterns. In other embodiments, the identification of the patterns may be manually performed, or may be performed with varying degrees of automation.

In the event that at least one entity is unable to identify a general pattern acceptably realizing the public tasks, it then, in one embodiment, a failure to specify controls may be recognized, and the method 300 terminates at 332.

On the other hand, should a suitable pattern be identified (e.g. by a publishing organization or by mutual agreement of two or more collaborating organizations), the relevant pattern is then mapped against the relevant private components of at least one entity, and potentially against private components of the workflows of multiple entities where such multiple entities are collaborating with respect to a workflow. The mapping of the selected pattern against components of a private workflow can be performed by respective pattern mapper modules 212 of workflow management systems 200 of each of the respective entities collaborating with respect to a collaborative workflow. To facilitate the mapping of a pattern against components of the private workflow, workflow task descriptions may be augmented with semantic information. For example, such information may be required access rights for performing task, required target business objects etc.

Public roles, required for the identified public components of the public workflow, are then identified (operation 304) and these public roles are mapped (operation 320) to corresponding private workflow roles. This mapping may be performed, in one example embodiment, by the roles mapper modules 214 of entities collaborating in terms of a collaborative work process. Again, the identified public roles may then be related (operation 306) to each other based on an exclusive relationship, depending on whether this is required for the controls (e.g., for the specification of a separation of duty property). As already mentioned above, these exclusive relationships may also include further identifiers (e.g., workflow model identifiers or partner identifiers) as two roles may be exclusive in one context, but not in another. A mapping (operation 322) between the relevant public exclusive relationships and the corresponding private role relationships may then be performed.

Business objects associated with the public tasks of the public workflow (identified as corresponding to the private tasks of the private workflow) may then be identified (operation 308), and these identified business objects mapped to business objects referenced at a private workflow level (operation 324). Further, some of the identified business objects may be defined (operation 310) as being critical in terms of their requirement for certain dynamic separation of duty properties or other controls. The critical status of public objects is then mapped (operation 326) to the status of private objects referred to by the private workflow.

At operation 312, controls (e.g. separation of duty properties) on the pattern (identified at operation 316) may be defined. In one embodiment, these controls may be defined based on desire or pre-existing private controls 204 that are associated with private workflows 206. In another embodiment, the controls may be defined with respect to the relevant public tasks (or components) of the public workflow, as opposed to the pattern. The public controls (separation of duty constraints) are then mapped to corresponding private controls 204 (e.g., separation of duty constraints) at operation 328. In this way, a public control is associated with a public task, based on a private control relating to a private task. This mapping, at operation 328, may be performed in an example embodiment by a separation of duties mapper module 218 of a respective workflow management system 200 operated by an entity.

In order to prevent an entity from modifying any of the mappings (e.g., role, exclusive relationship and critical object mapping as described above), an entity may need to produce unique tokens that enable verification, at some later point, that no configuration alterations or modifications have been performed. Accordingly, each entity collaborating with respect to a collaborative workflow process, and for which mappings between identified public tasks and corresponding private tasks have been performed (e.g., role, exclusive relationship and critical object mappings), at operation 330 may publish integrity tokens. In one example embodiment, the unique tokens may be produced utilizing standard hash generation algorithms, such as MD5 which create a unique number for a given input (e.g. document).

Figure 4:
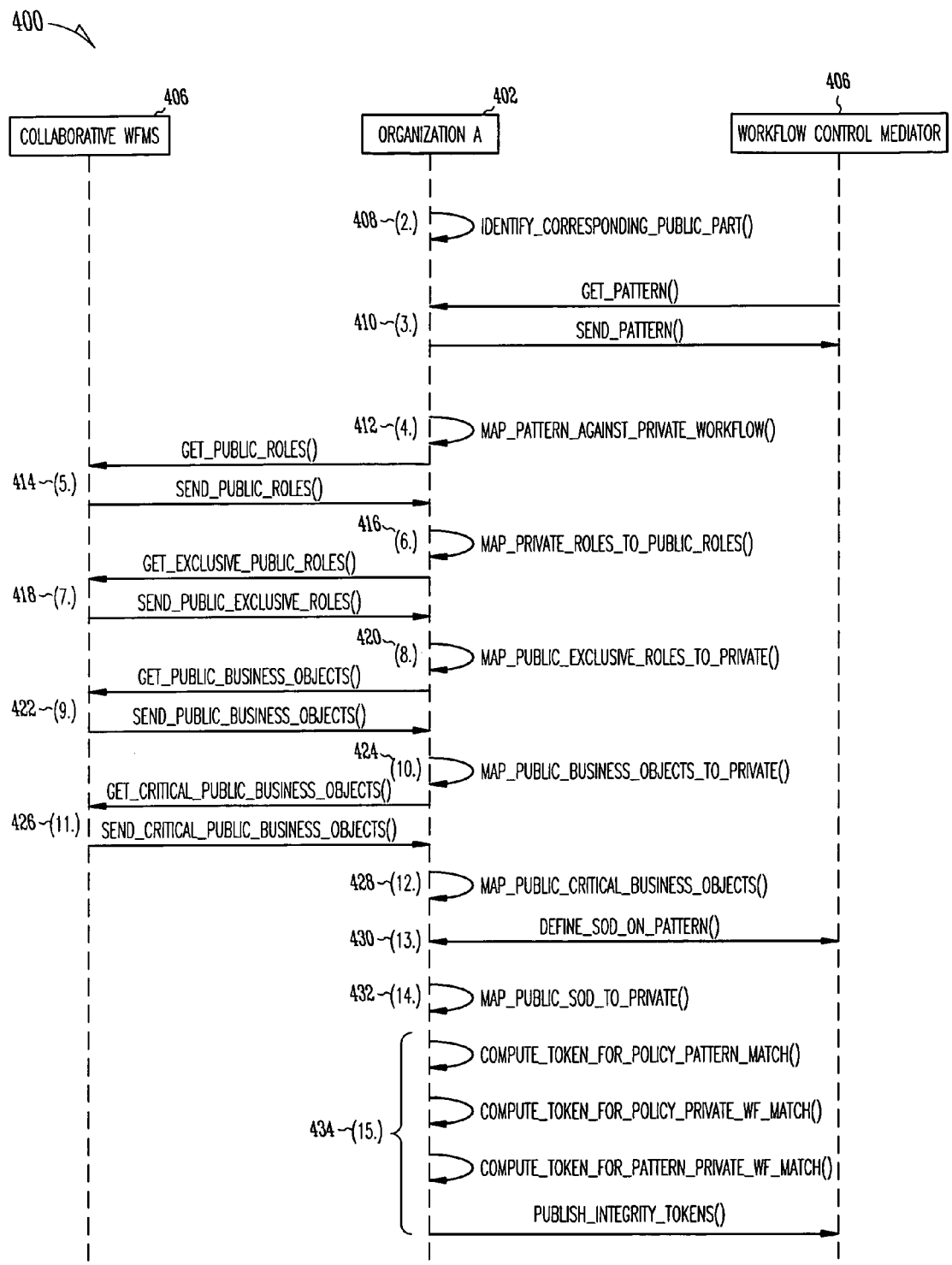
FIG. 4 is an interaction diagram illustrating a method, according to an example embodiment, by which an organization may define static or dynamic separation properties on a private workflow.

FIG. 4 is an interaction diagram illustrating a method 400, according to an example embodiment, that is a specific example realization of the more general method 300, discussed above with reference to FIG. 3. FIG. 4 shows the principal entities involved in the method 400 as being an organization 402, a workflow control mediator 404, and a collaborative workflow management system 406. In the example scenario illustrated in FIG. 4, the organization 402 publishes controls (e.g., separation of duty properties) on one of a number of its private workflows, using the workflow control mediator 404.

The organization 402 identifies (operation 408) public tasks corresponding to private tasks of its private workflow, with respect to which it wishes to publish controls. The organization 402 then requests and obtains a general pattern, corresponding to the identified public tasks, from the work control mediator 404, at operation 410. The organization 402, at operation 412, then proceeds to map the pattern, received from the workflow control mediator 404, against its private workflow at operation 412. The pattern mapping may, in an example embodiment, be performed by a workflow management system 200 associated with the organization 402, and more specifically utilizing a pattern mapper module 212.

The organization 402 requests and obtains (operation 414) public workflow roles, relating to the public tasks identified at operation 408, from the collaborative workflow management system 406. The organization 402, at operation 416, matches private roles of its private workflow to the public roles, received at operation 414. In one example embodiment, the matching operation may be performed by a roles mapper module 214 of a workflow management system 200 operated by the organization 402. Consider, for example that a specific role (e.g., role A) as visible in the public tasks may be that of an accountant, while the matching role in the private workflow may be the role of a junior, senior or a temporary accountant. Accordingly, a mapping of private roles (e.g., junior, senior and temporary accountant roles) to a single public role (e.g., accountant) may occur, in this example, at operation 416.

The organization 402 identifies (operation 418) public roles (or defines such public roles) as exclusive, whereafter the exclusive status of certain roles is mapped to the corresponding private roles at operation 420.

At operation 422, the organization 402 obtains public business objects, which match private business objects referenced by its private workflow, at operation 402, these public business objects are being obtained from the collaborative workflow management system 406. The public business objects are then mapped (with operation 424) to private business objects referenced by the organization's private workflow. For example, consider the case in which a business object, at a public workflow level, is composed of several internal and private objects. An example of such a public object may be a "contract", while a "formal offer is"", "supporting calculation" and a non-disclosure agreement" may constitute corresponding private objects to which the public object "contract" may be mapped at operation 424, for example.

At operation 426, the organization 402 may then request identification of business objects, referenced by the public workflow, that are identified as critical from the collaborative workflow management system 406. Having identified (or otherwise defined) certain public business objects as critical, the organization 402, at operation 428 proceeds to map the critical statuses to corresponding private business objects at operation 428.

The organization and the workflow control mediator 404, at operation 430, then define controls (e.g., separation of duty properties) on the pattern retrieved at operation 410 (or otherwise defined or identified with respect to the public tasks identified at operation 408). The definition of controls at operation 430 may be performed using, for example, exclusive roles and critical objects, as required within the relevant context.

The defined public controls, defined with respect to the public workflow, are then mapped to the private workflow by the organization, at operation 432. For example, one possible control may be a policy specifying that two exclusive private roles (e.g., that of senior and junior accountant) should never be occupied by the same person. As a further example, a critical object (e.g., a "calculation" object) may be specified, in terms of certain controls, never to be accessible by a junior accountant role. A further possible control (e.g., policy) may specify that if a "senior accountant" has signed a contract, then a person in the role of "external accountant" must countersign to guarantee independence.

Moving on to operation 434, the organization 402 then computes a series of tokens (e.g., as unique hash values) to represent the mapping between the published controls (e.g., a policy) with respect to the public tasks of the public workflow and elements of the private workflow. Specifically, (1) one or more tokens are generated to represent the match between the control (e.g., policy) pertaining to a pattern and the workflow pattern (e.g., as identified at operation 410) itself; (2) one or more tokens may be generated to represent a match between the private controls (e.g., policies) and the private workflow; and (3) one more tokens may be generated to represent the match between the private workflow and the workflow pattern. The controls (e.g., policy) pertaining to the pattern, together with the integrity preserving tokens generated at operation 434, are then published via the workflow control mediator 404.

Figure 5:
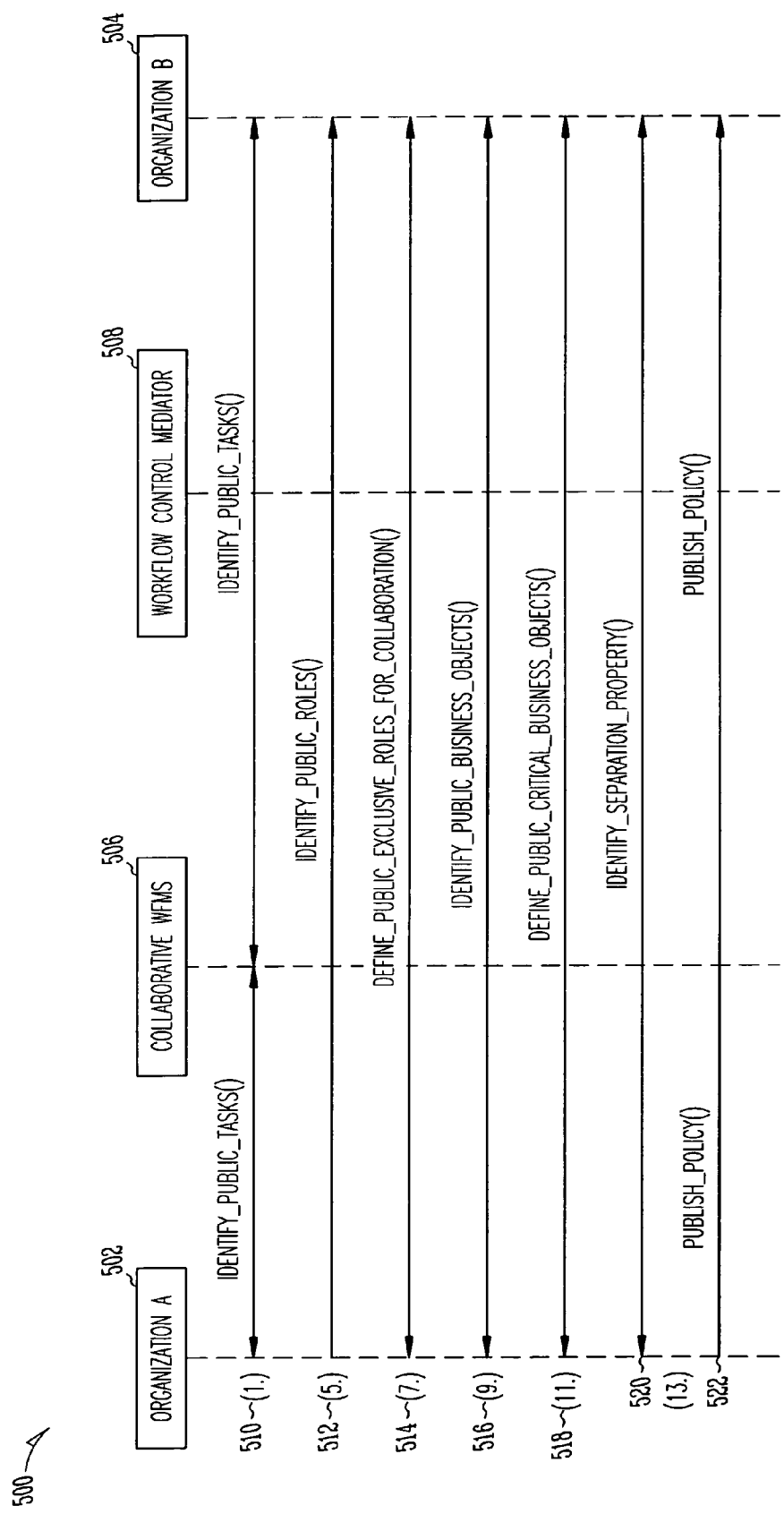
FIG. 5 is an interaction diagram illustrating a method, according to an example embodiment, by which two organizations may define a dynamic separation property on a public workflow.

FIG. 5 is an interaction diagram illustrating a method 500, according to an example embodiment, that may be performed as a further example realization of the general method 300 discussed above with reference to FIG. 3. In the example method 500, two organizations 502 and 504 wish to define and publish controls (e.g., separation of duty properties, rules or constraints) on a public workflow implemented via a collaborative workflow management system 506. A workflow control mediator 508, while illustrated in FIG. 5, is not active in the example method 500 as the controls (e.g., separation of duty properties) are being defined with respect to a public collaborative workflow process (as opposed to a collaborative workflow process including both public and private tasks). At operation 510, the organizations 502 and 504, together with the collaborative workflow management system 506, identify their public tasks in a public workflow. Each of the organizations 502 and 504 may further identify (operation 512) public roles then selectively define (operation 514) certain of these public roles as being exclusive, if required for specification of the control.

The organizations 502 and 504 may further identify public business objects at operation 516, and at operation 518 define one or more of the public business objects as critical, again if so required for the specification of the relevant control. At operation 520, the organizations 502 and 504 identify, negotiate and determine controls (e.g., separation properties) on the public workflow, and, at operation 522, individually publish an agreed upon set of controls (e.g., properties), these controls being published via the collaborative workflow management system 506.

Figure 6A:
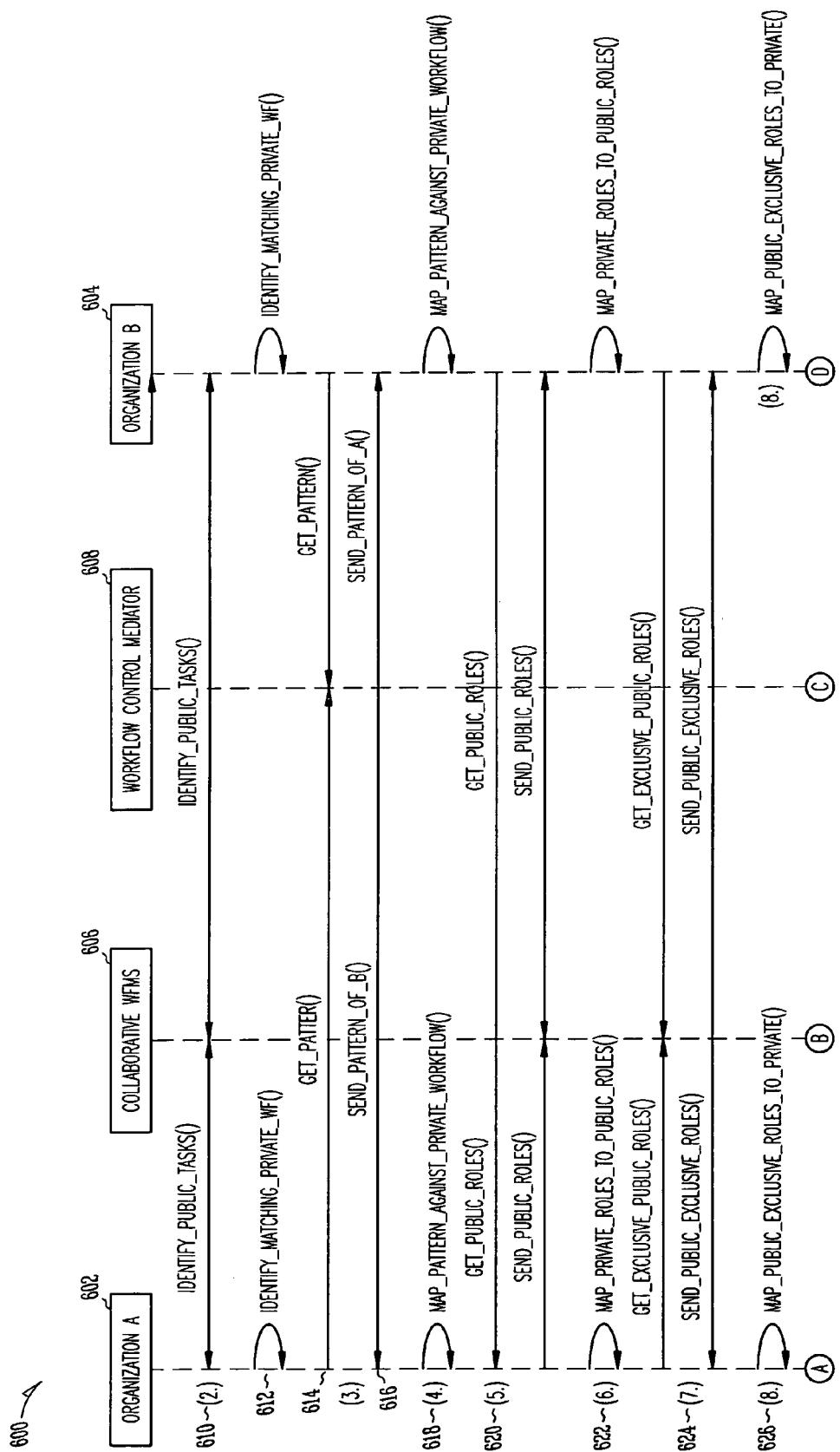
FIG. 6 is an interaction diagram illustrating a method, according to an example embodiment, by which two organizations may specify separation properties with respect to their own private workflows.
Figure 6B:
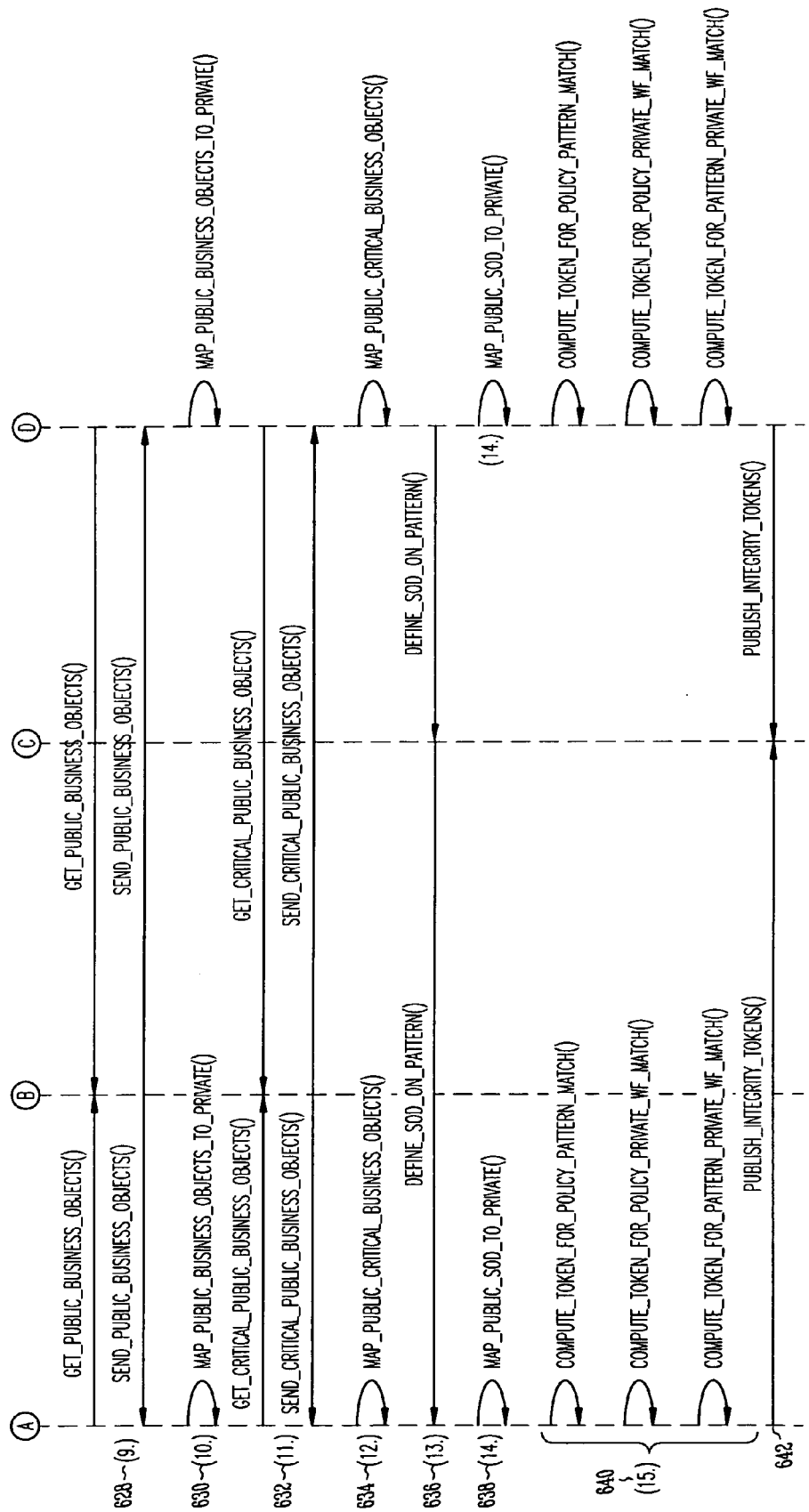

FIG. 6 is an interaction diagram illustrating a further method 600, according to an example embodiment, that constitutes one possible realization of the general method 300 described above with reference to FIG. 3. In the method 600, two organizations 602 and 604 publish controls (e.g. separation of duty properties) relating to respective private workflows via a collaborative workflow management system 606, utilizing a workflow control mediator 608.

Together with the collaborative workflow management system 606, the organization 602 and 604 identify (operation 610) public tasks in a public workflow controlled by the collaborative workflow management system 606. At operation 612, each of the organizations 602 and 604 identifies a matching private workflow, realizing respective public tasks identified at operation 610.

At operation 614, each of the organizations 602 and 604 requests, and obtains from the workflow control mediator 608, a pattern corresponding to each of a set of public tasks identified at operation 610. Accordingly, in one embodiment, an organization 602 will receive a pattern requested and obtained by organization 604, and vice versa. If either of the organizations 602 and 604 fails to locate a pattern that satisfactorily matches a particular public task, then the method 600 terminates.

Having obtained the respective patterns at operation 614, each of the organizations, at operation 616, requests and obtains a corresponding general pattern from the other organization, via the workflow control mediator 608. At operation 618, each of the organizations maps the received general pattern against respective private workflows.

Each of the organizations 602 and 604 then, at operation 620, requests and obtains public workflow roles, associated with the set of public tasks identified at operation 610, from the collaborative workflow management system 606. At operation 622, each of the organizations 602 and 604 matches private roles of their respective private workflows to the public roles retrieved at operation 620. For example, the specific role of organization 602 may be visible in the public workflow as an "accountant" role, while in the private workflow of organization 602, this role may be mapped to the roles of "junior accountant", senior accountant", and "temporary accountant."

At operations 624 and 626, each of the organizations 602 and 604 obtains and/or defines appropriate public roles as exclusive, followed by a mapping of the exclusive status of these roles to the appropriate private roles of the private workflows of the organizations 602 and 604.

At operations 628 and 630, each of the organizations 602 and 604 obtains and maps public business objects (referenced by the relevant public workflow) to private business objects referenced by the private workflows of the organization 602 and 604. For example, it may be the case that a public business object is composed of several internal and private objects, within the respective private workflows. As an example, again consider that a public business object may be a "contract", while corresponding private business objects may include a "formal offer", a "supporting calculation", and a "non-disclosure agreement."

At operations 632 and 634, each of the organizations 602 and 604 obtains business objects that are defined as "critical" in terms of the private workflow (or each of these organizations may define business objects as such), whereafter the respective organizations 602 and 604 map the "critical" status to corresponding private business objects, referenced by respective private workflows.

At operation 636, both of the organizations 602 and 604, and the workflow control mediator 608, then define controls (e.g. separation of duty properties) on the pattern identified at operation 614 and 616. The definition of the controls may be performed, for example, utilizing exclusive roles and/or critical objects, as required by the context. While the definition of the separation properties may be manually performed, the definition of separation properties may also be performed in an automated manner based on earlier manual definitions for similar cases.

Thereafter, at operation 638, each of the operations 602 and 604 maps the public control (e.g., a separation of duty property) to a respective private workflow. For example, one possible control may be a policy that requires that two exclusive private roles (e.g., junior and senior accountant) should never be occupied by the same person. In another example, a policy may dictate that a critical object "calculation" may never be accessed by a "junior accountant" role. As a third example, a policy may specify that if a senior accountant has signed a contract, then a person in the role of "external accountant" must also countersign to guarantee independence.

At 640, each of the organizations 602 and 604 computes a series of tokens (e.g., as hash values) that represent the match between a respective pattern policy and the general workflow pattern, the match between a private policy and a respective private workflow, and a match between a respective private workflow and the general workflow pattern. The policies for the patterns, together with the integrity preserving tokens, are then published via the workflow control mediator 608 at operation 642.

It will accordingly be appreciated that the various example embodiments described above enable the specification of controls (e.g., separation of duty constraints, rules and policies) in a collaborative workflow environment and further enable the specification of such constraints to be performed in a centralized manner. Further, the example embodiments may enable details of private workflows of entities to remain hidden (to an extent desired or required) and also enable the stating of context variables (e.g., exclusive roles, exclusive tasks) on which the specification of controls may be based. Further, through the various mapping operations, the controls may be defined with respect to a public workflow, but then also realized in respect of private workflows through appropriate mappings.

Figure 7:
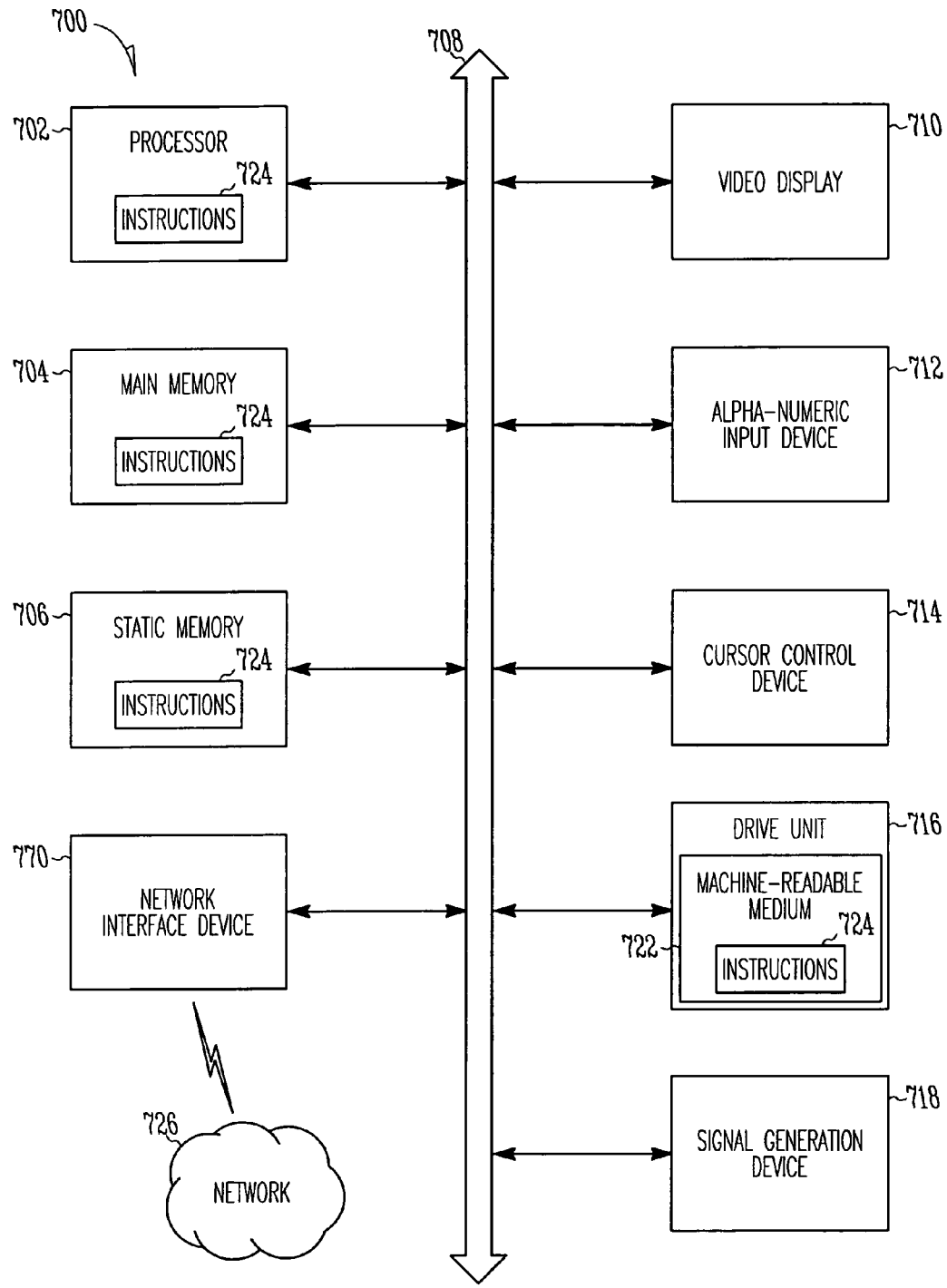
FIG. 7 is a diagrammatic representation of a machine, in the example form of a computer system, within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   mapping, using one or more processors, a private task of a private workflow of a first entity to a public task of a public collaborative workflow;
   mapping private roles of the private workflow of the first entity to public roles of the public collaborative workflow;
   identifying a first role of the public collaborative workflow as being exclusive; and
   defining a public control relating to the public task, the public task and the public control to be published to a second entity with which the first entity collaborates utilizing the public collaborative workflow, the public control being defined in terms of a separation of duties with respect to the public task.

2. The method of claim 1, including mapping the public control to the private task of the private workflow of the first entity.

3. The method of claim 1, wherein the separation of duties comprises a rule pertaining to performance of the public task.

4. The method of claim 1, including identifying a process pattern, to represent the private task, utilizing the public task to which the private task corresponds.

5. The method of claim 4, including defining the separation of duties in terms of the process pattern.

6. The method of claim 1, including mapping the separation of duties, with respect to the process pattern, to a separation constraint in terms of the private workflow.

7. The method of claim 4, wherein the process pattern is defined by an independent pattern publisher.

8. The method of claim 7, wherein the independent pattern publisher is a trusted third party.

9. The method of claim 1, including mapping private business objects of the private workflow of the first entity to public business objects of the public collaborative workflow.

10. The method of claim 9, including identifying a first business object of the public business objects as being critical.

11. The method of claim 1, including generating a unique token utilizing at least the mapping of the private task to the public task.

12. The method of claim 1, further comprising mapping a control of the private workflow to the public control of the published public task corresponding to the private task of the private workflow.

13. A system comprising:
   one or more processors;
   a mapper module to map, using the one or more processors, a private task of a private workflow of a first entity to a public task of a public collaborative workflow, and to map private roles of the private workflow of the first entity to public roles of the public collaborative workflow, a first role of the public collaborative workflow being identified as being exclusive; and
   an access module to access a public control relating to the public task, the public task and the public control to be published to a second entity with which the first entity collaborates utilizing the public collaborative workflow, the public control being defined in terms of a separation of duties with respect to the public task.

14. The system of claim 13, wherein the mapper module is to map the public control to the private task of the private workflow of the first entity.

15. The system of claim 13, wherein the separation of duties comprises a rule pertaining to performance of the public task.

16. The system of claim 13, wherein the mapper module is to identify a process pattern, to represent the private task, utilizing the public task to which the private task corresponds.

17. The system of claim 16, wherein the separation of duties is defined in terms of the process pattern.

18. The system of claim 13, wherein the mapper module is to map the separation of duties, with respect to the process pattern, to a separation constraint in terms of the private workflow.

19. The system of claim 16, wherein the process pattern is defined by an independent pattern publisher.

20. The system of claim 19, wherein the independent pattern publisher is a trusted third party.

21. The system of claim 14, wherein the mapper module is to map private business objects of the private workflow of the first entity to public business objects of the public collaborative workflow.

22. The system of claim 14, including a token module to generate a unique token utilizing at least the mapping of the private task to the public task.

23. A non-transitory machine-readable storage medium in communication with at least one processor, the machine-readable storage medium storing instructions which, when executed by the at least one processor, performs operations comprising:
   mapping a private task of a private workflow of a first entity to a public task of a public collaborative workflow;
   mapping private roles of the private workflow of the first entity to public roles of the public collaborative workflow;
   identifying a first role of the public collaborative workflow as being exclusive; and
   accessing a public control relating to the public task, the public task and the public control to be published to a second entity with which the first entity collaborates utilizing the public collaborative workflow, the public control being defined in terms of a separation of duties with respect to the public task.

* * * * *